United States Patent
Viti

(10) Patent No.: US 7,164,244 B2
(45) Date of Patent: Jan. 16, 2007

(54) APPARATUS FOR CONTROLLING ELECTRIC MOTORS AND RELATED CONTROL METHOD

(75) Inventor: Marco Viti, Cornaredo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 156 days.

(21) Appl. No.: 11/001,660

(22) Filed: Dec. 1, 2004

(65) Prior Publication Data
US 2005/0280382 A1 Dec. 22, 2005

(30) Foreign Application Priority Data
Dec. 11, 2003 (EP) ............................. 03425796

(51) Int. Cl.
*H02P 3/08* (2006.01)
(52) U.S. Cl. .................. 318/254; 318/138; 318/439; 318/601; 388/907; 388/912
(58) Field of Classification Search ............ 318/138, 318/254, 439, 601, 603, 798, 799; 388/907, 388/912
See application file for complete search history.

(56) References Cited

U.S. PATENT DOCUMENTS

| | | | | |
|---|---|---|---|---|
| 4,320,331 A | | 3/1982 | Plunkett | |
| 4,368,411 A | * | 1/1983 | Kidd | 318/254 |
| 4,528,486 A | * | 7/1985 | Flaig et al. | 318/254 |
| 4,570,110 A | * | 2/1986 | Bloom et al. | 388/809 |
| 5,038,092 A | * | 8/1991 | Asano et al. | 318/811 |
| 5,254,926 A | * | 10/1993 | Miller et al. | 318/798 |
| 6,016,042 A | * | 1/2000 | Miura et al. | 318/430 |
| 6,111,384 A | * | 8/2000 | Stagnitto | 318/602 |
| 2003/0133316 A1 | | 7/2003 | Lacour | |

* cited by examiner

*Primary Examiner*—Rina Duda
(74) *Attorney, Agent, or Firm*—Hogan & Hartson LLP

(57) ABSTRACT

An electric motor controller controls the currents flowing through the phase windings of an electric motor. The electric motor controller includes driving stages for driving respective phase windings of the motor and a memory for storing samples of reference signals. The driving stages force currents corresponding to the reference signals through a respective phase winding of the motor. The electric motor controller includes circuitry to determine subdivision degree intervals of an electric rotation and circuitry for comparing one of the currents flowing through the respective phase windings of the motor with at least one of the samples of the respective reference signal in at least one portion of each one of the degree intervals.

20 Claims, 8 Drawing Sheets

| | 0°–30° | 30°–60° | 60°–90° | 90°–120° | 120°–150° | 150°–180° | 180°–210° | 210°–240° | 240°–270° | 270°–300° | 300°–330° | 330°–360° |
|---|---|---|---|---|---|---|---|---|---|---|---|---|
| A | min | mid | max | max | mid | min | min | mid | max | max | mid | min |
| B | max | max | mid | min | min | mid | max | max | mid | min | min | mid |
| C | mid | min | min | mid | max | max | mid | min | min | mid | max | max |

← MID/MAX

| 0°–30° | 30°–60° | 60°–90° | 90°–120° | 120°–150° | 150°–180° | 180°–210° | 210°–240° | 240°–270° | 270°–300° | 300°–330° | 330°–360° |
|---|---|---|---|---|---|---|---|---|---|---|---|
| M1 | M1 | M1 | M1 | M1 | M1 | M2 | M2 | M2 | M2 | M2 | M2 |
| M6 | M6 | M6 | M5 | M5 | M5 | M5 | M5 | M5 | M6 | M6 | M6 |
| M3 | M4 | M4 | M4 | M4 | M4 | M4 | M3 | M3 | M3 | M3 | M3 |

← HMOS

| 0°–30° | 30°–60° | 60°–90° | 90°–120° | 120°–150° | 150°–180° | 180°–210° | 210°–240° | 240°–270° | 270°–300° | 300°–330° | 330°–360° |
|---|---|---|---|---|---|---|---|---|---|---|---|
| M2 | M1 | M1 | M1 | M1 | M2 | M1 | M2 | M2 | M2 | M2 | M1 |
| M6 | M6 | M6 | M5 | M5 | M5 | M5 | M5 | M5 | M6 | M5 | M5 |
| M3 | M3 | M4 | M4 | M4 | M4 | M4 | M3 | M3 | M3 | M3 | M3 |

← MMOS

APPARATUS FOR CONTROLLING ELECTRIC MOTORS AND RELATED CONTROL METHOD

FIELD OF THE INVENTION

The present invention refers to an apparatus for controlling an electric motor, particularly a brushless motor, and to a related control method.

BACKGROUND OF THE INVENTION

A brushless motor typically includes a permanent magnet assembled with a rotor and with a stator containing a certain number of windings (typically three) in a star or polygon (for example delta or triangle) connection.

Typically, the windings are driven by suitable half-bridges, one for each winding, and each one including two bipolar or MOS transistors. In FIG. 1, a circuit is shown which includes a brushless motor 1 with three windings 2–4 in a star connection and half-bridges 5–7 adapted to drive the respective windings 2–4. Each one of the half-bridges 5–7 includes two MOS transistors. More precisely, the half-bridges 5–7 include transistor pairs M1–M2, M3–M4, M5–M6. Transistors M1–M6 are driven by circuitry 10 and supplied by a voltage Vdd through a further MOS transistor M7 driven by circuitry 20 to open or close the supply path of transistors M1–M6. A resistance Rsense is arranged between the transistors M2, M4 and M6 and ground.

In the brushless motor, the current flowing through each winding is controlled because the torque is directly linked to this parameter; the control of the current is therefore necessary for optimal driving of the motor.

A known method for controlling the current provides for the driving of the MOS transistors M1–M6 so that the currents flowing through the windings 2–4 flow through the resistance Rsense. The voltage detected at the terminals of the resistance Rsense has a pseudo-sinusoidal modulation, that is a modulation with positive sinusoid arcs. Said voltage at the terminals of the resistance Rsense is filtered by low pass filter 11 and the output voltage signal is compared with a reference signal Vref, as shown by a dashed line in FIG. 1. In this way, a less precise control occurs because the average of the voltage that is at the terminals of the resistance Rsense is compared with the reference voltage.

What is desired, therefore, is a more precise control method and apparatus than provided by the prior art method and apparatus described above.

SUMMARY OF THE INVENTION

According to an embodiment of the present invention, a method and apparatus for controlling electric motors is provided that is more precise than the control method and apparatus of known prior art.

According to an embodiment of the present invention, and apparatus and control method for controlling an electric motor includes a plurality of phase windings and a rotor including a plurality of driving stages for driving respective phase windings of the motor and means for storing the samples of reference signals, the driving stages forcing currents in accordance to each one of the reference signals through a respective phase winding of the motor, including means to determine subdivision degree intervals of an electric rotation and means to compare one of the currents flowing through the respective phase windings of the motor with at least one of the samples of the respective reference signal in at least one portion of one of the degree intervals and for each one of the degree intervals.

BRIEF DESCRIPTION OF THE DRAWINGS

The features and the advantages of the present invention will be made evident by the following detailed description of an embodiment thereof, shown as not limiting example in the annexed drawings, wherein:

FIG. 5($b$) is a more detailed view of a part of the apparatus in FIG. 2, which is similar to that of FIG. 5($a$), according to a variation of the embodiment of the present invention;

FIG. 6 shows truth tables employed by the circuits shown in FIGS. 5($a$) and 5($b$);

FIG. 7($b$) shows another schematic for an alternative memory block for use with the circuits shown in FIGS. 5($a$) and 5($b$)

DETAILED DESCRIPTION

Figure 1:
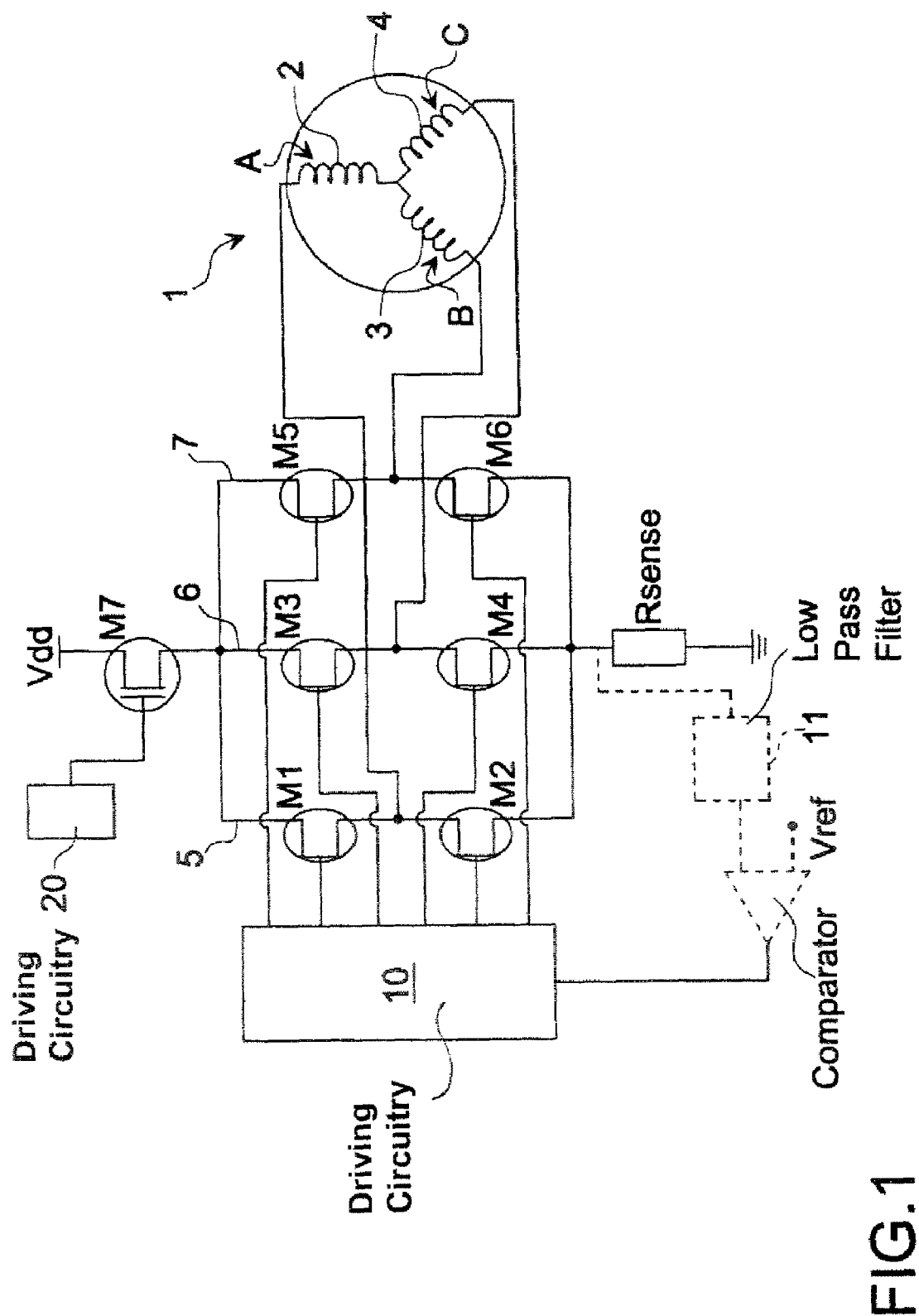
FIG. 1 is a schematic of an apparatus for driving a brushless motor according to the prior art.

Referring now to FIGS. 2–5($a$) an apparatus for controlling a brushless motor according to an embodiment of the present invention is shown; the elements equal to those of the circuit schematic in FIG. 1 use the same numeric references. The apparatus in FIG. 2 includes a brushless motor 1 with three windings 2–4 in a star connection and half-bridges 5–7 adapted to drive respective windings 2–4. Each one of the half-bridges 5–7 includes two MOS transistors. Half-bridges 5–7 include transistor pairs M1–M2, M3–M4, M5–M6. Transistors M1–M6 are supplied by a voltage Vdd through MOS transistor M7 driven by circuit 20 to open or close the supply path of the transistors M1–M6. A resistance Rsense is arranged between the transistors M2, M4 and M6 and ground.

A device 100 controls the current flowing through the windings 2–4 by suitably controlling the MOS transistors belonging to the half-bridges 5–7 for selecting the single current which flows through the selected winding among the windings 2–4 and for making the current flow through the resistance Rsense.

Device 100 compares the voltage signal at the terminals of the resistance Rsense, where one of the currents of the windings 2–4 flows, with a voltage reference signal. The waveform of the reference signal is of the type of the current to be controlled. In the case wherein the waveforms of the respective reference signals refA–refC are three rectified sinusoids out of phase of 120° and the amplitude of which is proportional to a value Ref but it is adjustable (see FIG. 4). The sinusoidal currents A–C (see FIG. 3) to be controlled are forced to flow through the windings 2–4. The samples of the reference signals refA–refC are stored inside means 112 belonging to device 100. Device 100 has at the inputs a clock signal CLOCK and a reset signal RESET which are used by some logic blocks inside the same device 100.

The comparison between the voltage deriving from the single current flowing through the resistance Rsense and the respective reference signal, more precisely a sample of the respective reference signal, occurs by means of a comparator COMP.

More precisely, device 100 includes means 112 for storing the samples of the reference signals refA–refC, means 101–107 for generating time periods T deriving from the subdivision of a time period corresponding to an electric rotation and of equivalent degree intervals H, means COMP to compare one among the currents A–C with a sample of the respective reference signal refA–refC for each time period T (see FIG. 5(*a*)).

As shown in further detail in FIG. 5(*a*), control device 100 includes a block 101 including a detector of the instantaneous position of the motor, for example a detector of the crossing at the zero (Zero Crossing) of the BEMF (Back Electromotive Force) at the terminals of one of the windings 2–4. Block 101 emits a pulse every time the BEMF assumes a zero value. The signal ZC output from block 101 has a frequency proportional to that of rotation of the motor and includes, for example, one pulse for 360 rotation electric degrees, that is for an electric rotation. Signal ZC is used as a synchronizing signal for controlling the currents of the windings 2–4.

A multiplier block 102 has to generate a signal Scan having a frequency higher than of that of the signal ZC, for example a frequency having a value F, which is equal to 36 times the frequency value of the signal ZC. In the case wherein the signal ZC includes a pulse every 360 electric degrees, the signal Scan is given a pulse repeated every 10 electric degrees.

During the starting phases of the motor, when a motor position reference signal is not available, a suitable device 103 may generate a signal ExtZC similar to the signal ZC and a signal ExtScan similar to the signal Scan.

Two OR gates 104 and 105 assure the presence of one between the signal ExtZC or ZC and ExtScan or Scan at the input of circuit block 107. Circuit block 107 is assigned to count the degree intervals H, which correspond to the time periods T, which preferably are equal to each other and are, for example, 10 degrees. Circuit block 107 is a counter used to count the intervals H of an entire electric rotation, namely 360°. Counter 107 has at the input the clock signal CLOCK and the reset signal RESET.

Circuit block 106 determines a degree interval H2 and pre-charges the counter 107 with the degree interval when the signal ExtZC or ZC is received. The counting of counter 107 is synchronized with signals ExtZC or ZC. Every time counter 107 receives the signal ExtScan or Scan it increases a quantity H, which corresponds, for example, to an interval of 10 electric degrees. When the counting arrives to a value of F times the interval H (that is 360°), the counter is set to zero.

It is necessary to determine the currents to be controlled for the first degree interval H. In the case of a motor having windings in a star connection, the sum of the currents A–C is zero. Therefore, it is possible to restrict the number of the currents to be controlled to two. Particularly, it can be decided to control from time to time the two currents that for each instant are the highest ones in absolute value. In this way, the voltage at the terminals of the resistance Rsense is higher and the signal/noise rate is higher.

A logic block 108 has to determine from time to time, that is for each instant internal to the time period T, which one between the maximum current and the medium current in absolute value has to be controlled. Logic block 108 is preferably implemented by a toggle type flip-flop, which has at the input a signal deriving from the OR gate 104. The flip-flop is controlled by a signal P and it determines an output signal that indicates which currents between the maximum or medium has to be selected. For example, an output value of block 108 that is equal to zero can indicate the selection of the maximum current, while the value equal to one can indicate the selection of the medium current. The toggle type flip-flop changes the value of the output signal only if the signal P is present. It is reset for each output pulse of the OR gate 104.

Another circuit block 109 receives at the input a signal deriving from the logic block 108 and the selected interval H deriving from the block 107. Circuit block 109 selects, by a table MID/MAX, which one of the currents A–C is the maximum or the average current in absolute value in the selected degree interval H. For example, if the logic block 108 has decided to control the maximum current in a determined interval H, for example from 0° to 10°, the maximum current in absolute value is then selected, in such a case the current B. In the table MID/MAX, the maximum values (max), the medium values (mid) and the minimum values (min) of the currents A–C for the twelve intervals of 30 electric degrees which compose an electric rotation are stored (see FIG. 6).

A circuit block 110 receives from the logic block 109 the information referred to which one of the currents A–C has to be controlled, in such case the current B. It receives from the logic block 107 the selected interval H. It selects, using the output signal SP, the sample of the reference waveform among the reference signals refA–refC which corresponds to the current B, that is refB, among all the samples of the reference signals refA–refC which are in the circuit block 112. Circuit block 112 preferably includes a memory where the samples of the reference signals refA–refC are stored. Block 110 is an address decoder that points to the memory addresses of the block 112.

The information output from block 108 is sent to another circuit block 111 that, according to such information and according to the selected interval H, has to select which one of the MOS transistors M1–M6 have to be turned on for controlling the current. Block 111, in accordance with whether the current is medium or maximum in the time period T, selects using one of the two tables MMOS and HMOS, respectively for the medium and the maximum current in absolute value, which transistors have to be turned on. For example, if the selected current is the current B for the time period between 0° and 30°, the block 111 selects using the table HMOS the transistors M1, M3 and M6 which have to be turned on for making the current to flow through the resistance Rsense. The circuit block also sends a control signal COM for turning on the selected MOS transistors simultaneously to the sending of the control signal SP for selecting the sample CP of the reference signal among the signal refA–refC which corresponds to the current to control.

The sample CP of the selected reference signal, for example the signal refB, is amplified by amplifier 113 and the output signal CM is sent to the input of a comparator COMP where it is compared with the voltage Vrsense given by the current B by the value of the resistance Rsense.

When the signal Vrsense becomes equal to or higher than the signal CM, after a time period T1 smaller than or equal to T and corresponding to a portion of or all the degree interval H is passed, a control signal P is sent from the comparator COMP to the block 108 for changing the value of the output signal, in such case for selecting the medium current. In the case between 0° and 30° the medium current is the current C and when the signal Vrsense becomes equal to or higher than the signal CM, a new control signal P is sent to the block 108 to make again the control of the maximum current B.

When the signal Scan or ExtScan arrives at the block 107 there is a passage to a successive degree interval H, for example the passage to the interval between 10° and 20°.

Figure 7A:
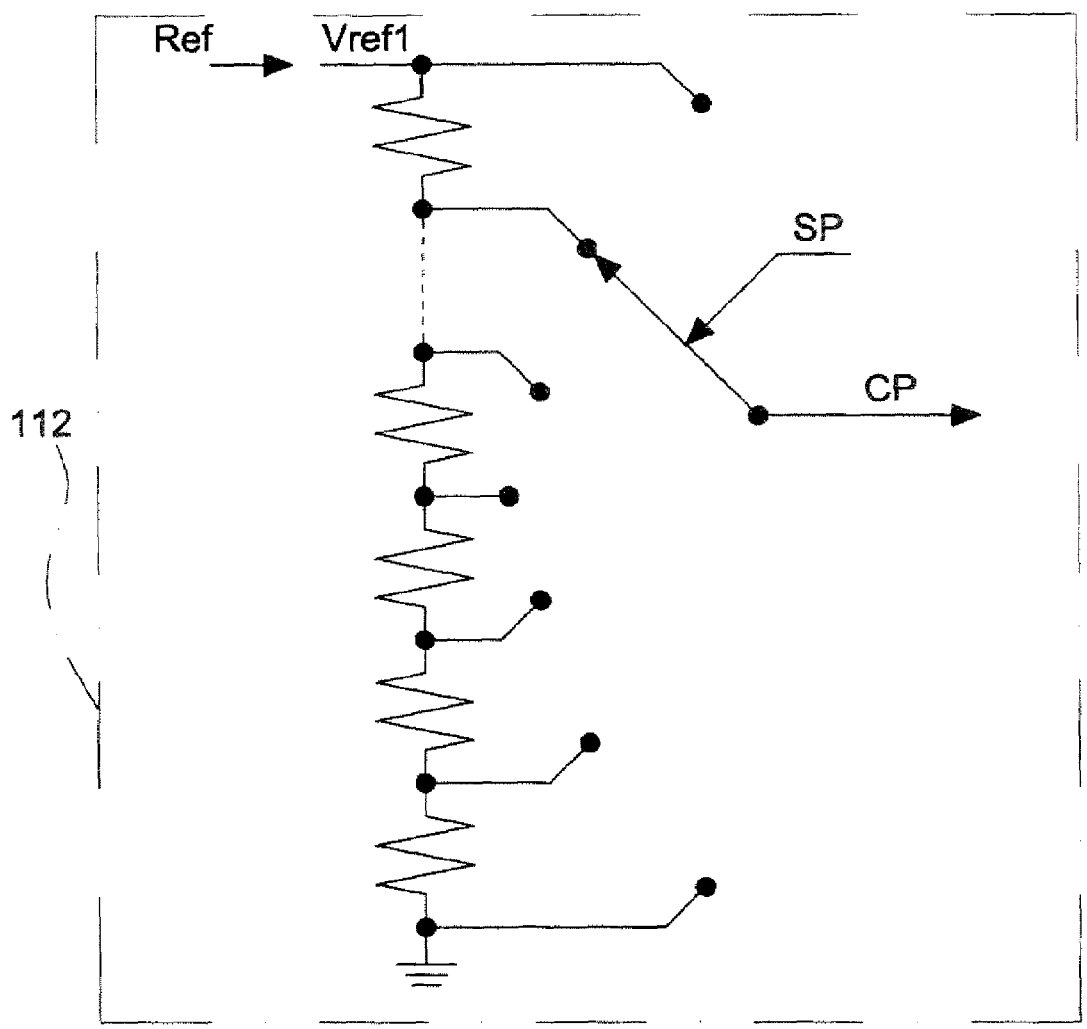
FIG. 7($a$) shows a schematic of a memory block for use with the circuits shown in FIGS. 5($a$) and 5($b$)

The samples constituting the normalized reference profile, that is the signals refA–refC, are stored in the block 112. Such storing can happen digitally, wherein the waveform is sampled in N bits and in a sample number X (see FIG. 7(b)), or in an analog fashion, for example by a resistive path supplied at the ends by voltage Vref1 and ground and wherein parts of the path provide divided voltages of the voltage Vref1 (see FIG. 7(a)). By considering the sinusoidal profiles of the currents, a reduced number of the samples constituting the entire 360 degrees can be memorized.

Since the reference signals or simply references refA–refC have equal waveforms but are out of phase 120° from each other, a single sampling of the waveform in 36 samples can be carried out. At a prefixed time instant, the samples of the different references refA–refC are different. For example, at the beginning instant at 0° the sample of the reference refA is 0, the sample of the reference refB is 24 while the sample of the reference refC is 12. The decoder 110 has to point to the corrected sample among the samples stored in the memory 112.

In the case of analog memorizing, the voltage Vref1 can be obtained from the value Ref by an amplification constant or, in the case wherein the value Ref is expressed by means of a digital word having NR bits, the value Vref1 is obtained by a digital/analog converter.

Figure 7B:
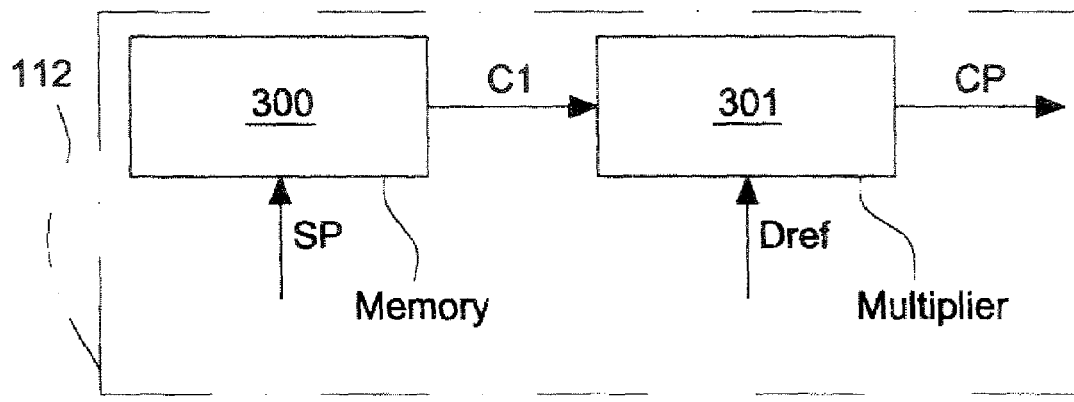

In the case of digital memorizing, by indicating with C1 the sample deriving from the memory 300 where all the samples X are included and which is selected by means of the signal SP, a modulation CP of the sample C1 can be computed by means of a multiplier 301. As can be seen in FIG. 7(b), CP=C1*Dref where Dref is a digital word with NR bits which derives from the value Ref that can be an analog quantity (in such case Dref is obtained by analog/digital conversion) or a digital quantity (Dref is obtained from Ref by means of an amplification constant). Since the sample C1 is indicated with N bits and Dref is indicated with NR bits the modulated sample CP has NM bits where NM=N+NR. The bits of such bit quantity which are believed to be non-significant can be rejected.

The comparator COMP can be both of the analog type, with the analog signals CM and Vrsense at the input, or of the digital type. For the digital case the voltage Vrsense must be converted to a digital word by an analog/digital converter which has to be compared with the amplified digital signal deriving from blocks 112 and 113 in the case wherein they are implemented digitally.

Figure 5A:
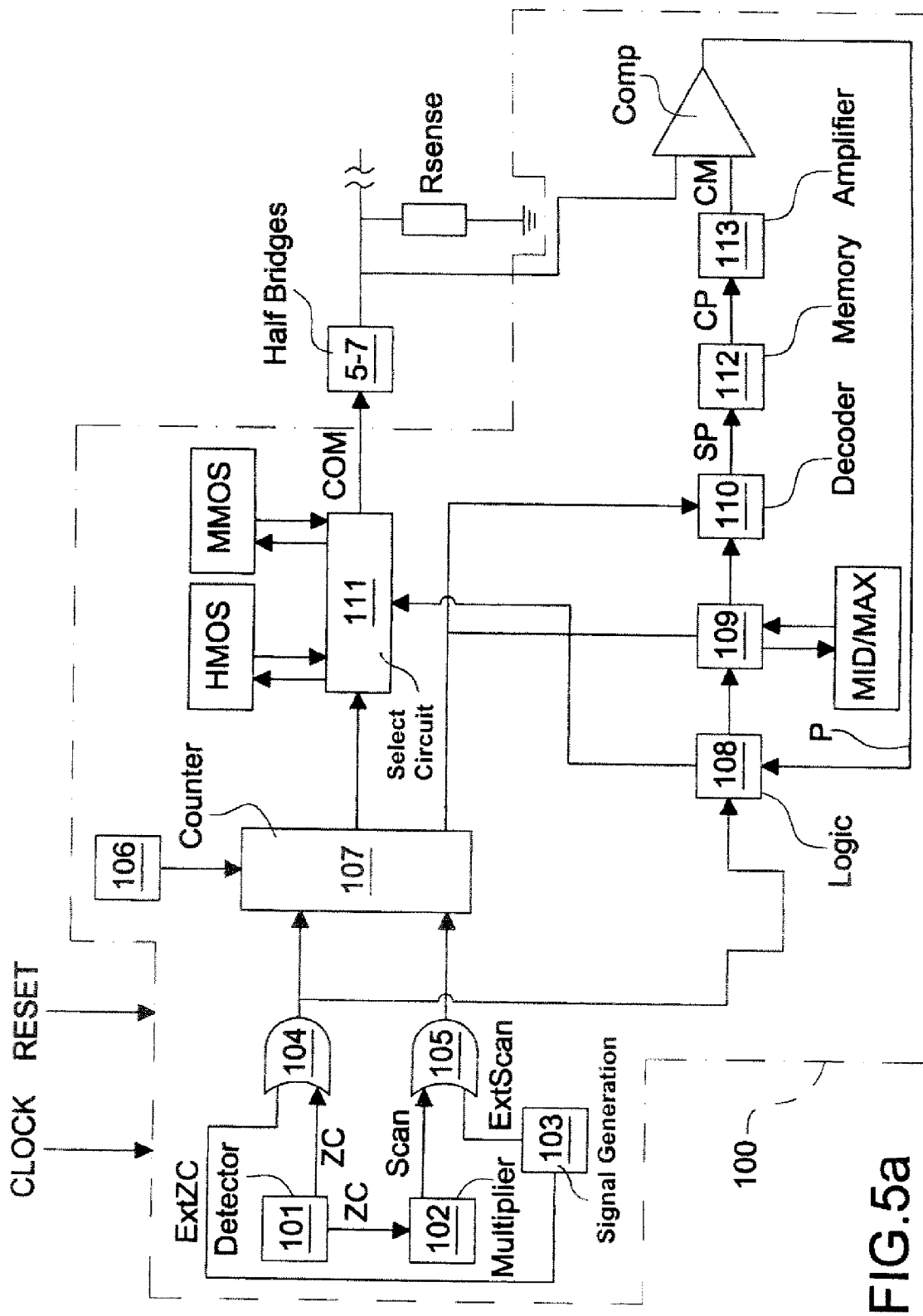
FIG. 5($a$) is a more detailed view of a part of the apparatus in FIG. 2 according to an embodiment of the present invention.
Figure 5B:
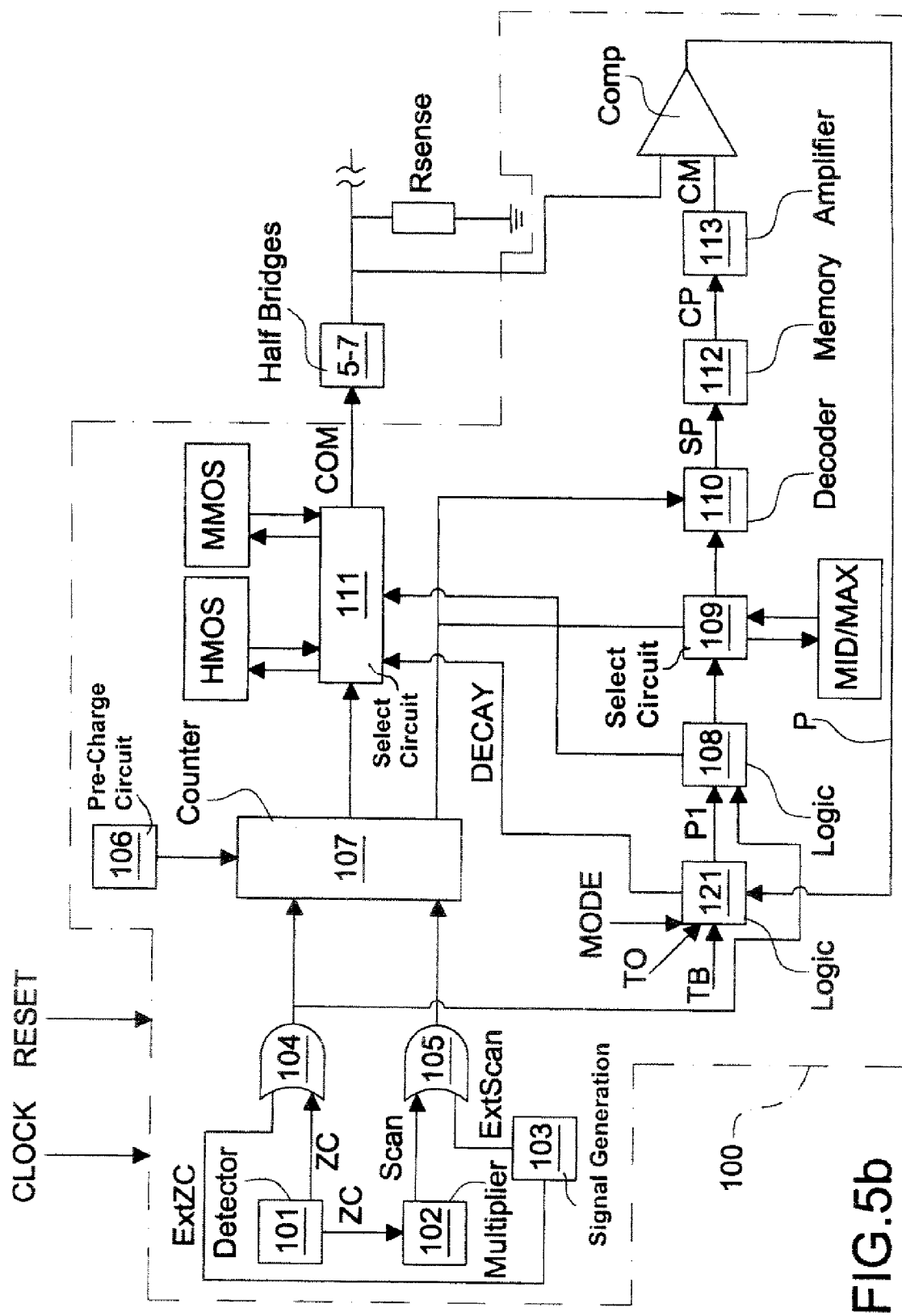

An apparatus according to a variant of the embodiment of the present invention is shown in FIG. 5(b). The only differences with respect to the embodiment shown in FIGS. 2–5(a), 6–79b) are the following. The flip-flop 108 is not controlled any more by the signal P but it is controlled by an output signal P1 of the logic block 121, which has at the input the signal P, and it determines always the output signal adapted to indicate which of the medium or maximum currents must be selected. For example, an output value of the block 108 which is equal to zero can indicate the selection of the maximum current, while the output value equal to one can indicate the selection of the medium current. The toggle type flip-flop changes the output value only if the output signal P1 of the block 121 is present while it is reset at each output pulse of the OR gate 104.

Block 121 has a second output signal, that is the signal DECAY adapted to control the block 111, When the signal is activated it forces block 121 to put the half-bridges 5–7 in a recycle state. The recycle time is necessary when the switching frequency is too high, of about 100 Khz, or it is too low, of about 40 Khz. Block 121 implements therefore a time period called "Time-Out", which fixes the maximum time period for managing each winding. It establishes in such time period the part thereof which must be dedicated to the effective energization and the part thereof instead which must be dedicated to a recycle for decline of the current.

The block 121 has other two inputs by which the time periods TO and TB, with TO>TB, can be set from outside, or alternatively the time period TB can be defined inside the block 121. Therefore, in any case, the time periods TB and TO are prefixed. The block 121 comprises a counter adapted to count down from TO to 0 and it is configurable from the outside by a further input MODE allowing to select three different managing modes. In the first and in the second managing modes the counter counts down continuously from TO to 0, while in the third managing mode the receiving of the signal P makes the counter count down from TB to 0 whatever the present value is in the counter. For all the operations there is a recycle time period higher than or equal to the time period from TB to the instant 0. More specifically, the first mode is not sensitive to the receiving of the signal P because if the signal P is received or it is not received the counter always counts down from TO to 0 and the recycle time is equal to TB. In the second mode, with the receiving of the signal P at a value TC between the time values TO and TB, a recycle time that is higher than the value TB and which is comprised between the values TC and 0 is set. In the case wherein the value TC is lower than the value TB the recycle time period is given by the time period from TB to 0. In the third mode, the receiving of the signal P puts the counter to set at the value TB for setting a recycle time TB. Therefore, if the value TA, which is counted when the signal P is received, is higher than the value TB a recycle time equal to TB occurs. If the counted value TA is lower than the value TB the recycle time is given by TB+TB−TA. Therefore the input signal DECAY of the block 111 is active for all the time in which the counter inside the block 121 shows a value substantially equal to the time period from TB to 0 or even, in the case of the second mode, substantially equal to the time period from TC to 0.

The counter inside the block 121 has at the input the external clock signal CLOCK and the reset signal RESET.

The first output signal P1, when activated, forces the state change of the flip-flop 108 even if through the present winding the desired current level does not flow yet. In fact, the signal is activated when the counter of the block 121 starts to count the time period from TB to 0 even if the signal P is not received.

In a variation of the embodiment of the present invention, when the signal DECAY received from the block 111 is active the same signal forces the signal COM to set in a recycle state the half-bridges 5–7. That is, it forces transistors M1, M3 and M5 to turn on (high recycle) or the transistors M2, M4 and M6 to turn on (low recycle) in an independent way from the state of its other inputs. That is, the signal DECAY has the priority with respect to all the other inputs of the block 111 and therefore the selection of the transistors for determining the recycle of the currents has the priority with respect to the other control operations of the half-bridges 5–7 which can be carried out by the block 111.

The control apparatus according to invention also carries out the various operations according to the following method.

Figure 2:
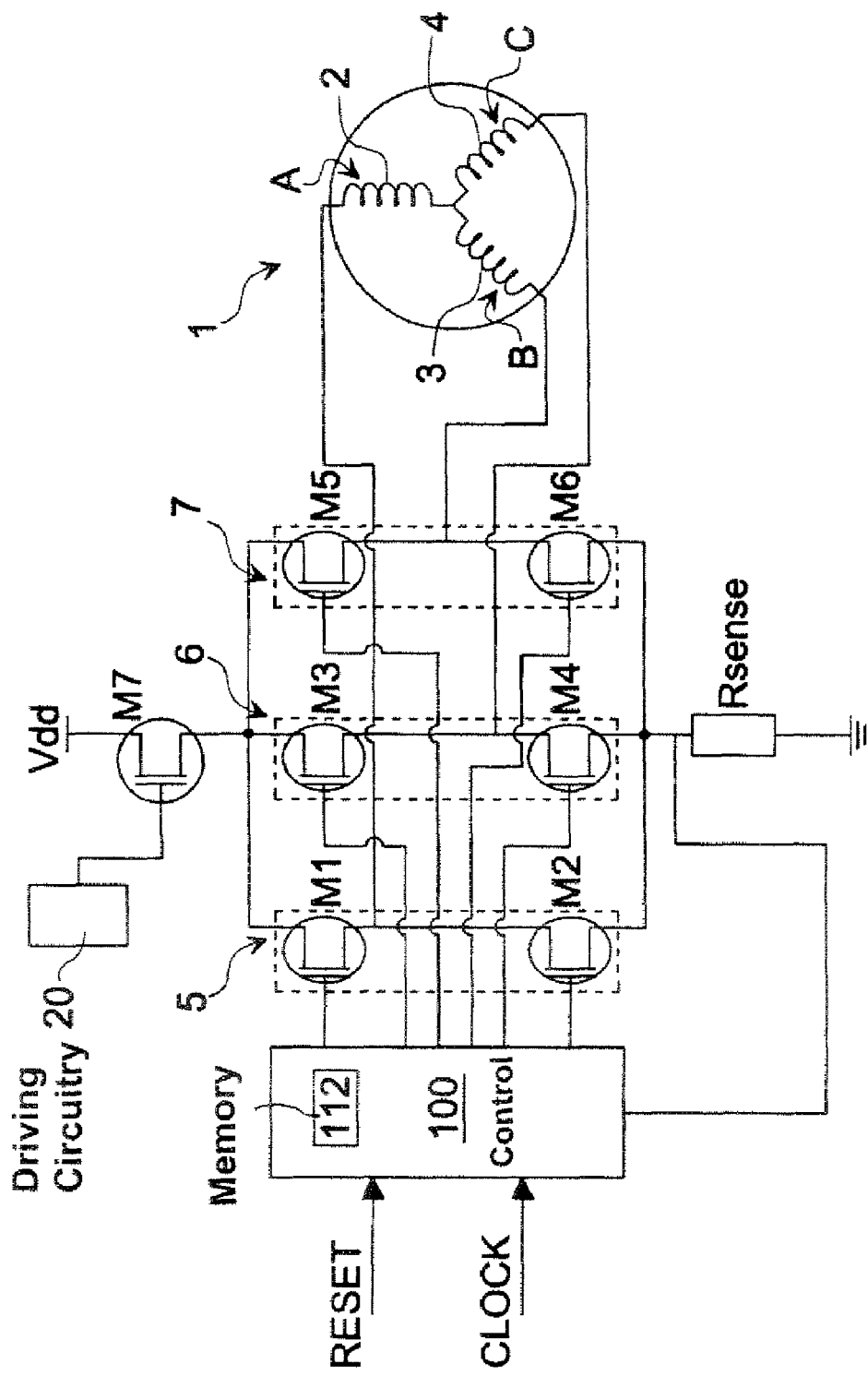
FIG. 2 is a schematic of an apparatus for controlling a brushless motor according to an embodiment of the present invention.
Figure 3:
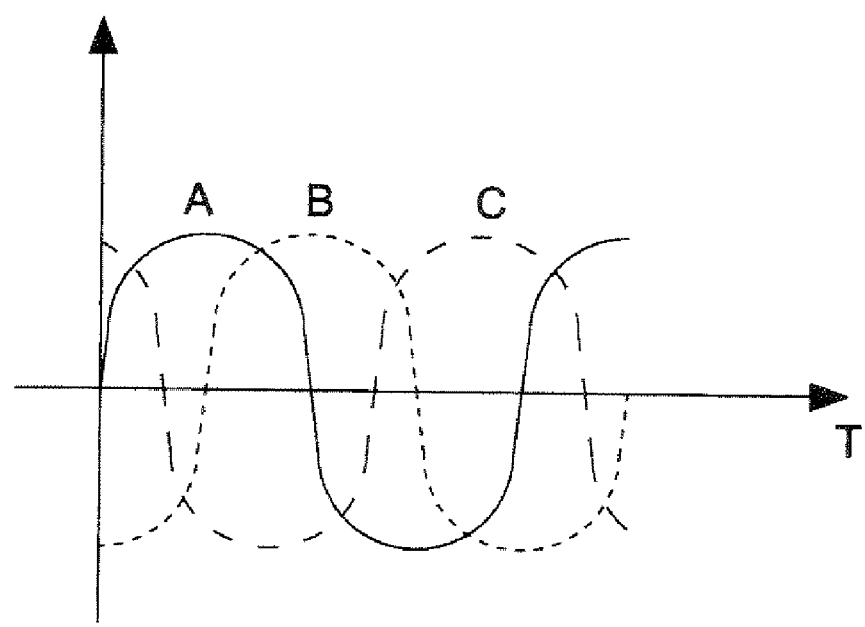
FIG. 3 is a timing diagram of the currents flowing through the windings of the brushless motor in FIG. 2.
Figure 4:
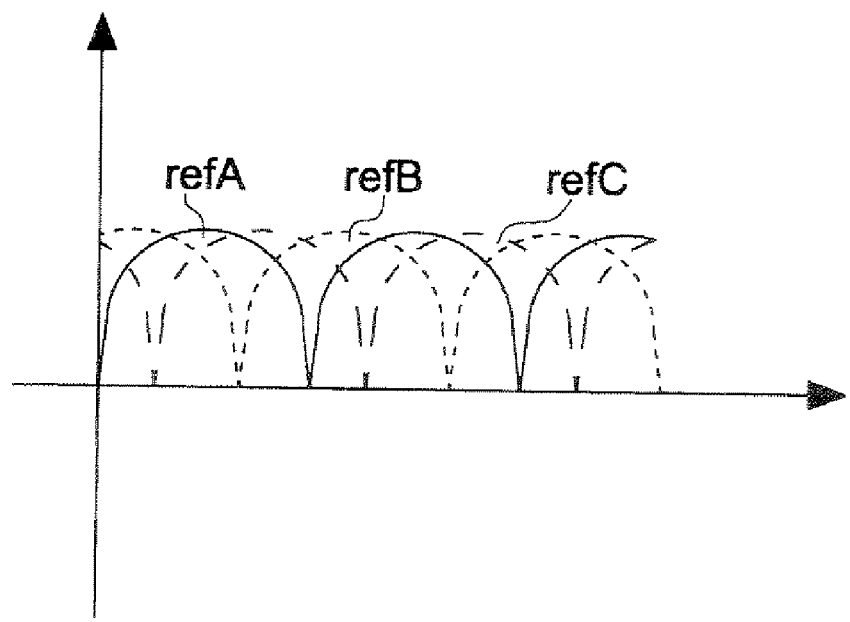
FIG. 4 is a timing diagram of the reference signals used in the apparatus in FIG. 2.

The method for controlling an electric motor 1 by means of the apparatus in FIG. 2, wherein the electric motor comprises a plurality of phase windings 2–4, and a rotor and the apparatus comprises a plurality of driving stages 5–7 for driving respective phase windings 2–4 of the motor 1, comprises a first step for forcing a current A–C according to each of the reference signals refA–refC through a respective phase winding 2–4 of the motor 1 by means of said driving stages 5–7. The method comprises a second step for generating degree intervals H of a subdivision of an electric rotation by circuit blocks 101–107 and a third step for comparing of one single of the currents A–C flowing through the respective phase winding of the motor 1 with at least a sample CP of the respective reference signal refA–refC in at least one portion of a degree interval and for each one of said degree intervals H.

The second step comprises a sub-step for detecting the time instant of the zero crossing of the BEMF of a winding so that the counting of first time periods T to which said degree intervals H correspond is synchronized with a time instant proportional to said relieved time instant.

The third step comprises a first sub-step for selecting the current to be compared among the currents A–C flowing through the windings of the motor by first means 108 and 109, a second sub-step for controlling said driving stages 5–7 by second means 111 so that only said selected current flows through an element Rsense arranged downward the motor and for simultaneously selecting at least one sample CP of one of said reference signals refA–refC that is respective of said selected current by third means 110, and a third sub-step for comparing said at least one selected sample CP with said selected current.

The first sub-step comprises a further sub-step for determining the value of the current A–C to be selected at a second time period lower than or equal to said first time period T and which corresponds to said at least one portion of degree interval H by means of a first element 108 and another sub-step for selecting the profile of said current in a given sequence MID/MAX indicating the profile of the current depending on the output signal of said first element and on each one of said degree intervals H.

The driving stages 5–7 comprise transistors M1–M6 and said second sub-step comprises a step for selecting the transistors of said driving stages which have to be turned on in base of the output signal of said first element and of each one of said degree intervals H.

The means 112 adapted to store the samples of the reference signals refA–refC comprise a memory and said second sub-step comprises the selection of the sample of the reference current in the memory in base of the selected current profile and of each one of said first time periods.

The element arranged downstream the motor is a resistance Rsense placed between said driving stages 5–7 and ground and said third sub-step comprises the comparison between the current flowing through said resistance and the sample CP of the selected current reference by means of a comparator COMP. The method comprises a further step where the output signal P of the comparator COMP controls the circuit block 108 to change the value of the current to control after said second time period is passed.

A recycle step can be provided by applying a recycle time fixed by the block 121 and in accordance with one among the managing mode of such block.

Figure 8:
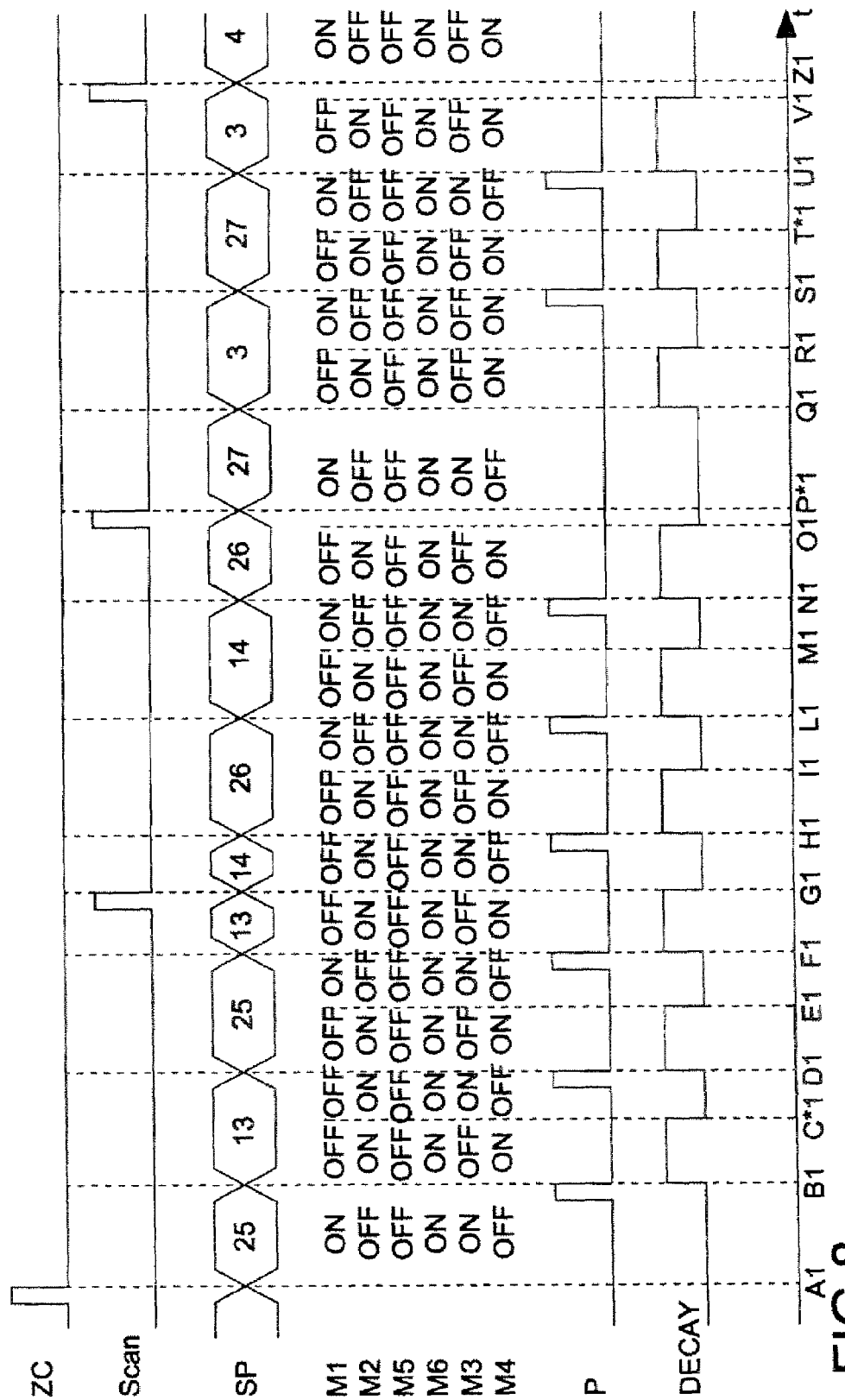
FIG. 8 shows a timing diagram associated with the circuit shown in FIG. 5($b$).

A time diagram adapted to show schematically the numerous operations performed by the device 100 according to a variation of the embodiment of the invention as shown in FIG. 5(b) is shown in FIG. 8 where it is assumed that the block 121 is set by the signal MODE to operate according to the third managing mode. That is, the recycle time TB for reaching the level of the signal sample is introduced. In the diagram the synchronizing signal is the signal ZC at the time instant A1, assuming an interval H2 of 10°. If the value of the current to be controlled is the maximum value in absolute value, the control B is controlled and because it is negative the MOS transistors M1, M3 and M6 will be turned on by using ON as turning on symbol and OFF as turning off symbol. At the time instant B1, the value of the current B in absolute value has reached the value of the sample 25 of the reference refB. In this case there is the switching of the comparator COMP and the related signal P determines the passage to the control of the medium current, in such case of the current C. The block 121 controls a recycle state for a time higher than or equal to TB in accordance with the third managing modality. Also the transistor M2, M4 and M6 are turned on (low recycle). The sample 13 of the reference refC is pointed and at the time instant C*1 (when the time TB finishes) the MOS transistors M2, M6 and M3 are turned on. At time instant D1 the value of the current C in absolute value has reached the value of the sample 13 of the reference refc. There is again the switching of the comparator COMP and the signal P determines the passage to control the maximum current, that is the current B, and again the sample 25 is selected. There is again a recycle time and the configuration, that is the pointing to the sample 25, is postponed to the point E1. The recycle between the points D1 and E1 happens by turning on only of the transistors M2, M4 and M6 (low recycle). When the configuration related to the current B with the transistors M1, M3 and M6 turned on, the point F1, the value of the current B in absolute value has reached the value of the sample 25 of the reference refB. In this case there is again the switching of the comparator COMP and the signal P determines the passage to control the medium current, that is the current C. The sample 13 of the reference refC is pointed but there is a low recycle state until the end of the recycle time. The end, which is at the point G1, coincides with the receiving of the signal Scan. The control of the current remains in the interval between 0° and 30° where the maximum current is still the current B but the current C is active and also the sample 14 is selected and the MOS transistors M2, M6 and M3 are turned on. Since, at the time instant H1, the value of the current C in absolute value has reached the sample 14 of the reference refC, there is the switching of the comparator COMP determining the passage to control the maximum current so that the sample 26 is pointed, even at the instant a recycle time is inserted with the turning on of the transistors M2, M4 and M6 until the time instant I1. Going on in accordance with the same mode described above, alternation between the samples 14 and 26, it is arrived to the instant P*1 where the signal Scan determines the passage into an interval for controlling the current between 30° and 60°. The maximum current remains the current B while the medium current is the current A; the samples to point are the sample 27 of the reference refB and the sample 3 of the reference refA. The sample 27 is pointed because the value of the current to control is the maximum value (current B) and the transistors M1, M3 and M6 are turned on. Since the switching frequency is too low, at the instant Q1 the block 111, in accordance with the third managing modality of the block 121, starts a recycle phase. The signal P1 determines the passage to control the successive sample, in such case the sample 3 of the reference refA, without waiting the switching of the comparator that is without waiting that the current B has reached the threshold set by the sample 27. The suitable configuration of the MOS transistors for controlling the current A is postponed to the instant R1 wherein the end of the time period higher than or equal to TB. It is continued with said method for all the electric degree interval of the currents that is between 0 and 360°.

Thus, one embodiment of the present invention is an apparatus for controlling an electric motor, said electric motor comprising a plurality of phase windings and a rotor, said apparatus comprising a plurality of driving stages for driving respective phase windings of he motor and means adapted to store the samples of reference signals, said driving stages forcing currents in accordance to each one of said reference signals through a respective phase winding of the motor, characterized by comprising means adapted to determine subdivision degree intervals of an electric rotation and means adapted to compare one of the currents flowing through the respective phase windings of the motor with at least one of the samples of the respective reference signal in at least one portion of one of said degree intervals and for each one of said degree intervals.

Optionally, the comparison means may comprise first means adapted to select said current to be compared among the currents flowing through the windings of the motor, second means adapted to control said driving stages in such a way that only said selected current flows through an element arranged downstream the motor and third means adapted to select said at least one sample of one of said reference signals which is respective of said selected current simultaneously to the action of said second means, fourth means adapted to compare the at least one selected sample with said selected current.

Also, the means adapted to determine said degree intervals may comprise means adapted to provide with a signal representative of the motor position, said means adapted to determine said degree intervals being adapted to synchronize the counting with said signal representative of the motor position and by counting first time periods to which said degree intervals correspond.

Optionally, the first means may comprise a first element adapted to determine the current to be selected in a second time period smaller than or equal to said first time period and which corresponds to said at least one portion of a degree interval and a second element adapted to select the profile of said current from a given sequence representing the current profile in base of the output signal of said first element and of each one of said degree interval.

In addition, the driving stages comprise transistors and said second means comprise a device adapted to select the transistors of said driving stages which have to be turned on in base of the output signal of said first element and of each one of said degree interval.

The apparatus may be further characterized in that said device selects the transistors to be turned on in given control sequences which are distinguished for the current value and each one of them indicating the transistors to be turned on in base of the output signal of said first element and of each one of said degree interval.

Also, the means adapted to store the samples of the reference signals comprise a memory and said third means comprise a further device which in base of the selected current profile and of each one of said first time periods is adapted to select the sample of the selected reference signal from said memory.

Also, the element arranged downstream the motor is a resistance placed between the driving stages and ground and said fourth means comprise a comparator adapted to compare the voltage at the terminals of said resistance and the voltage deriving from the sample of the selected reference signal.

The apparatus of this embodiment may be further characterized with said output signal of said comparator adapted to control said first element of said first means to change the value of the current to be selected after said second time period is passed.

The apparatus may also include further means adapted to control said second means for carrying out a recycle of the current in the driving stages for a recycle time interval by selecting the transistors of said driving stages, said recycle of the current having the priority with respect to each other action of said second means. These further means may receive the output signal from said comparator and are adapted to control said first element of said first means to change the value of the current to be selected after the determination of said recycle time interval. This recycle time interval may be a prefixed time interval. The apparatus may also be characterized in that said further means receive the output signal from said comparator and an external signal indicating a further prefixed time interval, said further means comprising a counter adapted to down-count said further prefixed time interval, said further means determining said recycle time interval as a function of the counted time instant where said output signal of the comparator is received, said time instant being higher than another prefixed time interval. Moreover, the further means may receive the output signal from said comparator and an external signal indicating a further prefixed time interval, said further means comprising a counter adapted to down-count said further prefixed time interval, the time instant where said output signal of the comparator is received being lower than another prefixed time interval and said counter re-starting to count from said another prefixed time interval at the receiving of said output signal of the comparator, said further means determining said recycle time interval as sum of said another prefixed time interval and of the difference between said another prefixed time interval and the counted time instant where said output signal of the comparator is received.

Optionally, the electric motor is a three-phase electric motor. The currents flowing through the windings of the motor may be characterized as sinusoidal currents.

In an embodiment of the present, a method for controlling an electric motor by means of an apparatus in which the said electric motor comprising a plurality of phase windings and a rotor and the apparatus comprising a plurality of driving stages for driving respective phase windings of the motor and means adapted to store the samples of reference signals, said method comprising a first step for forcing a current according to each one of the reference signals through a respective phase winding of the motor, characterized by comprising a second step for generating degree intervals of subdivision of an electric rotation and a third step for comparing one single of the currents flowing through the respective phase winding of the motor with at least one sample of the respective reference signal in at least one portion of one of said first degree intervals and for each one of said first degree intervals.

The above method may be further characterized in that said third step comprises a first sub-step for selecting the current to be compared among the currents flowing through the windings of the motor, a second sub-step for controlling said driving stages so that only said selected current flows through an element Rsense arranged downward the motor and for simultaneously selecting at least one sample of one of said reference signals that is respective of said selected current, and a third sub-step for comparing said at least one selected sample with said selected current.

The method may be further characterized in that said second step comprises a sub-step to synchronize the counting of first time periods to which said first degree intervals correspond with a signal representative of the motor position.

Additionally, this method may be further characterrized in that said first sub-step comprises a further sub-step for determining the value of the current to be selected at a second time period lower than or equal to said first time period and which corresponds to said at least one portion of degree interval and another sub-step for selecting the profile of said current in a given sequence in base of the current value and of each one of said degree intervals.

The method may also be characterized in that said driving stages comprise transistors and said second sub-step comprises a step for selecting the transistors of said driving stages which have to be turned on in base of the selected current and of each one of the degree intervals.

The method may also be characterized in that said second sub-step comprises the selection of the sample of the reference current in the memory in base of the selected current profile and of each one of said first time periods.

The method may also be further characterized in that said third sub-step comprises the comparison of the current flowing through a resistance arranged between said driving stages and ground and the sample of the selected reference signal. Optionally, the method may include a further step successive to the comparison step and for changing the value of the current to control after said second time period is passed and also may be characterized in that said third sub-step comprises a further step for introducing a time interval for recycling the current in the driving stages for a recycle time interval.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

I claim:

1. A method for controlling an electric motor including a plurality of phase windings and a rotor, comprising:
   providing a plurality of reference signals;
   forcing a current according to each one of the reference signals through a respective phase winding of the motor;
   generating degree intervals of a subdivision of an electric rotation; and
   comparing one of the currents flowing through the respective phase winding of the motor with at least one sample of the respective reference signal in at least one portion of one of the degree intervals such that only two of the currents flowing through a respective motor winding are controlled by selecting a maximum current and a medium current.

2. The method of claim 1 further comprising selecting the current to be compared among all of the currents flowing through the windings of the motor.

3. The method of claim 1 further comprising controlling driving stages so that only a selected current flows through a resistor in series with the respective phase winding of the motor.

4. The method of claim 1 further comprising counting a first time period corresponding to the first degree interval responsive to a signal representative of the motor position.

5. The method of claim 4 further comprising determining the value of the current to be selected at a second time period less than or equal to the first time period that corresponds to the at least one portion of the degree interval.

6. The method of claim 1 further comprising providing the forcing currents with a plurality of half-bridge circuits.

7. The method of claim 6 further comprising placing the half-bridge circuits in a recycle state.

8. The method of claim 6 further comprising selecting transistors in the half-bridge circuits.

9. The method of claim 1 further comprising controlling currents in two of the phase windings.

10. An electric motor controller comprising:
    a memory for storing samples of a plurality of reference signals;
    a plurality of driving stages for driving respective phase windings of the motor according to each one of the reference signals;
    circuitry to determine subdivision degree intervals of an electric rotation; and
    circuitry to compare one of the currents flowing through the respective phase windings of the motor with at least one of the samples of the respective reference signal in at least one portion of one of the degree intervals such that only two of the currents flowing through a respective motor winding are controlled by selecting a maximum current and a medium current.

11. The electric motor controller as in claim 10 further comprising circuitry for selecting the current to be compared among all of the currents flowing through the windings of the motor.

12. The electric motor controller of claim 10 further comprising circuitry for controlling the driving stages so that only a selected current flows through a resistor in series with the respective phase winding of the motor.

13. The electric motor controller of claim 10 further comprising a counter for counting a first time period corresponding to the first degree interval responsive to a signal representative of the motor position.

14. The electric motor controller of claim 10 further comprising circuitry for determining the value of the current to be selected at a second time period less than or equal to the first time period that corresponds to the at least one portion of the degree interval.

15. The electric motor controller of claim 10 further comprising a plurality of half-bridge circuits.

16. The electric motor controller of claim 15 further comprising circuitry for placing the half-bridge circuits in a recycle state.

17. The electric motor controller of claim 15 further comprising circuitry for selecting transistors in the half-bridge circuits.

18. The electric motor controller of claim 15 further comprising circuitry for controlling currents in two of the phase windings.

19. The electric motor controller of claim 10 wherein the electric motor comprises a three-phase electric motor.

20. The electric motor controller of claim 10 wherein the currents flowing through the windings of the motor comprise sinusoidal currents.

* * * * *